(12) United States Patent
Ohm et al.

(10) Patent No.: US 7,941,058 B2
(45) Date of Patent: May 10, 2011

(54) DEVICE AND METHOD FOR DECODING AN OPTICAL MULTI-LEVEL DPSK SIGNAL

(75) Inventors: Michael Ohm, Stuttgart (DE); Timo Pfau, Stuttgart (DE)

(73) Assignee: Universitat Stuttgart (DE)

( * ) Notice: Subject to any disclaimer, the term of this patent is extended or adjusted under 35 U.S.C. 154(b) by 778 days.

(21) Appl. No.: 11/568,440

(22) PCT Filed: Apr. 28, 2005

(86) PCT No.: PCT/EP2005/004577
§ 371 (c)(1),
(2), (4) Date: Oct. 18, 2007

(87) PCT Pub. No.: WO2005/107107
PCT Pub. Date: Nov. 10, 2005

(65) Prior Publication Data
US 2008/0166126 A1   Jul. 10, 2008

(30) Foreign Application Priority Data

Apr. 30, 2004   (DE) .......................... 10 2004 021 816

(51) Int. Cl.
*H04B 10/00* (2006.01)
(52) U.S. Cl. ........................................ 398/202; 398/214
(58) Field of Classification Search ........... 398/202–214
See application file for complete search history.

(56) References Cited

U.S. PATENT DOCUMENTS

| | | | | |
|---|---|---|---|---|
| 6,175,320 B1 * | 1/2001 | Heflinger | .................. | 341/137 |
| 6,266,173 B1 * | 7/2001 | Hayes | ........................ | 398/212 |
| 6,469,817 B1 * | 10/2002 | Heflinger | .................. | 398/202 |
| 7,187,871 B1 * | 3/2007 | Kaushik | ..................... | 398/183 |
| 7,272,327 B2 * | 9/2007 | Epworth et al. | .............. | 398/212 |
| 7,433,604 B1 * | 10/2008 | Kim et al. | ..................... | 398/188 |
| 7,460,793 B2 * | 12/2008 | Taylor | ......................... | 398/208 |
| 7,558,479 B1 * | 7/2009 | Robinson | ...................... | 398/28 |
| 2004/0081470 A1 * | 4/2004 | Griffin | ......................... | 398/188 |
| 2004/0218932 A1 * | 11/2004 | Epworth et al. | .............. | 398/202 |
| 2004/0258423 A1 * | 12/2004 | Winzer | ........................ | 398/202 |
| 2005/0260000 A1 * | 11/2005 | Domagala | ..................... | 398/188 |
| 2008/0166126 A1 * | 7/2008 | Ohm et al. | ..................... | 398/79 |
| 2009/0142077 A1 * | 6/2009 | Taylor | ......................... | 398/208 |
| 2009/0245814 A1 * | 10/2009 | Griffin | ......................... | 398/188 |

* cited by examiner

*Primary Examiner* — Agustin Bello
(74) *Attorney, Agent, or Firm* — Donald R. Boys; Central Coast Patent Agency, Inc.

(57) ABSTRACT

The invention refers to a device (1) for decoding an optical multi-level DPSK signal (E), the device (1) comprising: means for receiving the multi-level DPSK signal (E); at least two means (3) for transforming optical multi-level DPSK signals (E) into corresponding analog electrical signals (i); means (2) for splitting up the received multi-level DPSK signal (E) into at least two optical multi-level DPSK signals ($E_0$), one for each of the opto-electrical transforming means (3); means (8) for processing electrical signals (i, e); and at least two means (6) for transforming the analog electrical signals (i) into corresponding electrical logical binary signals (e). In order to provide multi-level DPSK receiver (1) with a reduced complexity, it is suggested that concerning the signal flow within the device (1) the analog-to-logical-binary transformation means (6) are disposed before the processing means (8) and that the processing means (8) process electrical logical binary signals (e).

12 Claims, 6 Drawing Sheets

DEVICE AND METHOD FOR DECODING AN OPTICAL MULTI-LEVEL DPSK SIGNAL

The present invention refers to a device for decoding an optical multi-level DPSK signal, the device comprising:
- means for receiving the multi-level DPSK signal;
- at least two means for transforming optical multi-level DPSK signals into corresponding analog electrical signals;
- means for splitting up the received multi-level DPSK signal into at least two optical multi-level DPSK signals, one for each of the opto-electrical transforming means;
- means for processing electrical signals; and
- at least two means for transforming the analog electrical signals into corresponding electrical logical binary signals.

Further, the invention refers to a method for decoding an optical multi-level DPSK signal, the method comprising the steps of:
- receiving the multi-level DPSK signal;
- splitting up the received multi-level DPSK signal into at least two optical multi-level DPSK signals;
- transforming the at least two split optical multi-level DPSK signals into corresponding analog electrical signals;
- transforming the analog electrical signals into corresponding electrical logical binary signals; and
- processing electrical signals.

Various methods for binary optical modulation are known in the art. The most widespread modulation format in optical fiber transmission systems is binary intensity modulation with direct detection (IM/DD). Differential phase-shift-keying (DPSK) has also been suggested for dense wavelength division multiplexing (DWDM) systems because of a higher robustness in the case of fiber non-linearities. In both formats, only one bit per symbol is transmitted, leading to rather poor spectral efficiencies. Recently, two quaternary optical modulation formats with direct detection (DD) have been proposed, which allow the transmission of two bits per symbol: combined amplitude-shift-keying/phase-shift-keying with DD (ASK-PSK/DD) and optical differential quaternary phase-shift keying (DQPSK).

The idea of the multi-level DPSK signal transmission is to associate to a number of bits of a bit stream to be transmitted a certain symbol. Instead of transmitting each of the bits separately, only the symbol associated to the bits is transmitted. On the receiver side the transmitted symbol is transformed into corresponding electrical logical binary signals, upon which an estimation of the transmitted bits of the bit stream is performed.

The advantage of the multi-level DPSK signal transmission in respect to a signal transmission bit by bit is that the transfer rate or bit rate can be increased considerably. Further, with a given bit rate, the transmission of a signal requires a lower bandwidth. When performing wavelength multiplexing, more signals can be disposed within a defined bandwidth. Further, the tolerance of the multi-level DPSK signal against distortions arising from the so-called dispersion in the transmission media can be increased considerably. Dispersion is due to different velocities of propagation within the media (glass or synthetics of the optical fiber) of the various frequencies of the spectrum of the signal to be transmitted.

A method and a device of the above-mentioned kind is disclosed in Ohm, M., et al.: "Differential optical 8-PSK with direct detection (8-DPSK/DD)", 4. ITG-Fachtagung, "Photonische Netze", Leipzig, May 2003, pages 177 to 181. The 8-DPSK receiver mentioned therein is adapted for the transmission of 3 bits per symbol and thus increases the spectral efficiency compared to previously suggested systems. The known 8-DPSK receiver comprises a splitter for splitting up the received 8-DPSK signal into three optical 8-DPSK signals. Further, the receiver comprises opto-electrical transforming means each comprising an optical delay and add filter (DAF) and an opto-electrical converter (O/E). Then, the analog signals are processed by analog signal processing means. Thereafter, the processed analog signals are transformed into corresponding electrical binary signals using appropriate means. The analog-to-logical-binary transformation means each comprise a sampling and binary threshold decision device. The output of the analog-to-logical-binary transformation means represents the bits corresponding to the transmitted symbol and are used for an estimation of the transmitted bits.

The known 8-DPSK receiver comprises and must comprise three opto-electrical transforming means (DAF, O/E), disposed in separate paths, one for each of the bits encoded in the transmitted symbol. Following the opto-electrical transforming means are analog electrical signal processing means comprising relatively complex and, therefore, difficult and expensive to realize operation of the analog electrical signals received from the opto-electrical transforming means. When processing the analog signals, the runtimes and other properties of the analog signals have to be considered. Finally, the processed analog signals are transformed into corresponding logical binary signals or bit sequences by the analog-to-logical-binary transformation means.

Based on the 8-DPSK receiver known in the art, it is an object of the present invention to provide a device for decoding a multi-level DPSK signal, which has a simpler configuration and which is cheaper in realization.

According to the present invention, this object is achieved by a device of the above-mentioned kind, characterized in that concerning the signal flow within the device the analog-to-logical-binary transformation means are disposed before the processing means and that the processing means process electrical logical binary signals.

The present invention suggests a multi-level DPSK receiver, which compared to the prior art has a reduced optical and electrical circuit complexity. The multi-level DPSK receiver according to the invention allows decoding of multi-level electrical signals occurring within the receiver. In particular, a 8-DPSK receiver is suggested for decoding optical 8-DPSK signals and internal 4- or 5-level electrical signals, respectively. The receiver according to the present invention comprises only two separate paths, with means for transforming optical multi-level DPSK signals into corresponding analog electrical signals disposed in each path. The means for splitting up the received optical multi-level DPSK signal into at least two optical multi-level DPSK signals may be realized by a cross coupler or any other suitable element for splitting up optical signals.

An important aspect of the present invention is the fact that not the analog electrical signals are processed by the processing means, but rather the electrical logical binary signals. This allows a much simpler configuration of the processing means and processing of the electrical signals can be simplified and facilitated considerably. Hence, the analog electrical signals received from the opto-electrical transforming means are first transformed into corresponding electrical logical binary signals before they are processed in the processing means.

The analog electrical signals received from the opto-electrical transforming means of the multi-level DPSK receiver according to the present invention comprise multiple internal levels. Displaying the analog electrical signals in so-called eye diagrams, e.g., shows that the signals after transformation of an optical 8-DPSK signal comprise 4 or 5 internal levels. In contrast thereto, the 8-DPSK receiver known in the prior art processes a binary analog electrical signal comprising only two different levels.

Hence, for receiving a transmitted bit stream only two multi-level signals are processed in the 8-DPSK receiver according to the present invention, instead of three or even more binary signals. This reduction is achieved because a multi-level signal contains more information than a binary signal, which is illustrated by the 4 or 5 levels of the analog electrical multi-level signal instead of the only 2 levels of the corresponding binary electrical signal processed in the prior art. This additional information in terms of additional levels of the analog electrical signal, according to the present invention, is used for reducing the circuit complexity of the multi-level DPSK receiver and for simplifying the decoding process of the multi-level DPSK signal. The multi-level DPSK receiver according to the present invention for the first time ever can internally handle not only binary electrical signals with only 2 levels, but rather multi-level electrical signals comprising more than 2 levels during the decoding process of the multi-level DPSK signals.

The number of levels of the analog electrical signal corresponding to the received optical multi-level DPSK signal depends on the number of bits, which are transmitted by the optical signal (e.g. 3 bits with 8-DPSK, 4 bits with 16-DPSK), and on which value the phase angle ψ in the optical delay and add filter (DAF) of the opto-electrical transforming means is set (e.g. 4-level vs. 5-level signal with 8-DPSK). The differential encoder has the function of encoding the bits of a bit stream to be transmitted to the multi-level DPSK receiver in such a way that after encoding the phase difference of the encoded signals contains the desired information to be transmitted. Further, encoding is preferably performed in such a way that on the receiving side no additional digital decoder is necessary (decoding of the binary signals is implicitly embodied in the multi-level DPSK receiver). Looking, e.g., at a 8-DPSK transmitter, the differential encoder has at its disposal 8 possible phase differences for encoding the bits to be transmitted into eight different symbols, each comprising 3 bits. Depending on which phase difference the differential encoder selects, the analog electrical signals corresponding to the received optical multi-level DPSK signal have certain levels. The number of levels depends on the receiver implementation.

According to a preferred embodiment of the present invention it is suggested that the device comprises exactly two opto-electrical transforming means. It is interesting that no matter how many bits per symbol are transmitted via the optical multi-level DPSK signal, two opto-electrical transforming means are enough for decoding the optical multi-level DPSK signal. Therefore, a multi-level DPSK receiver comprising two opto-electrical transforming means can be used for decoding 4-DPSK signals, 8-DPSK signals, 16-DPSK signals and even 64-DPSK signals or higher level DPSK signals. Only the number of means for transforming analog electrical signals into corresponding electrical binary signals has to be adapted to the number of bits per symbol transmitted via the optical multi-level DPSK signal. Preferably, each of the opto-electrical transforming means comprises an optical delay and add filter (DAF) and an opto-electrical converter (O/E). Of course, any other suitable means for transforming the received optical multi-level DPSK signal into a corresponding analog electrical signal can be used, too.

According to another preferred embodiment of the present invention it is suggested that each of the analog-to-logical-binary transformation means comprises at least one sampling and binary threshold decision device. Of course, it is possible to use any other kind of suitable analog-to-logical-binary transformation means, too. A first embodiment of a 8-DPSK receiver according to the invention has two analog-to-logical-binary transformation means, each of which comprise two sampling and binary threshold decision devices. A second embodiment of a 8-DPSK receiver according to the invention has two analog-to-logical-binary transformation means, the first of which comprising three sampling and binary threshold decision devices and the second of which comprising one sampling and binary threshold decision device.

According to yet another preferred embodiment of the present invention it is suggested that the processing means comprise means for conducting logical Boolean operations on the electrical binary signals received from the analog-to-logical-binary transformation means. Instead of conducting logical Boolean operations on the electrical binary signals within the processing means, it is also possible to use a look-up-table, a combinational network or any other suitable method for extracting or estimating the bits of the bit stream transmitted via the symbols from the optical multi-level DPSK signal.

According to a preferred embodiment of the invention, the device is realized as a 8-DPSK receiver for decoding an optical 8-DPSK signal. Of course, as already mentioned above, the device according to the present invention can be used for decoding any kind of multi-level DPSK signal other than a 8-DPSK signal, too. However, transmitting bits of a bit stream by means of a 8-DPSK signal, at least under the currently given technical possibilities, seems to be a good compromise between achieving high bit rates and providing a multi-level DPSK receiver with a simple design.

In the case of a 8-DPSK receiver, it is suggested that the device comprises exactly four sampling and binary threshold decision devices. It is suggested that at least one of the four sampling and binary threshold decision devices has a different threshold level than the other sampling and binary threshold decision devices.

According to a first preferred embodiment, it is suggested that a first and a second of the sampling and binary threshold decision devices is assigned to a first analog-to-logical-binary transformation means and that a third and a fourth of the sampling and binary threshold decision devices is assigned to a second analog-to-logical-binary transformation means. Preferably, the first and the third sampling and binary threshold decision devices have a first threshold level and the second and the fourth sampling and binary threshold decision devices have a second threshold level. This embodiment is particularly adapted for decoding multi-level DPSK signals with corresponding internal analog electrical signals comprising 5 electrical levels and 3 logical levels, respectively.

According to a second preferred embodiment it is suggested that a first of the sampling and binary threshold decision devices is assigned to a first analog-to-logical-binary transformation means and that a second, a third, and a fourth of the sampling and binary threshold decision devices are assigned to a second analog-to-logical-binary transformation means. Preferably, the first and the fourth sampling and binary threshold decision device have a first threshold level, the second sampling and binary threshold decision device has a second threshold level and the third sampling and binary threshold decision device has a third threshold level. This embodiment is particularly adapted for decoding optical multi-level DPSK signals with corresponding internal analog electrical signals comprising 4 logical levels.

It is further suggested that the processing means estimate the transmitted bit sequences from the electrical logical binary signals, and that further processing of the electrical logical binary signals is performed in order to gain additional information, for example for an error correction. The receiver according to the invention has at its disposal four electrical logical binary signals for estimating only three transmitted bit sequences. This implies a redundancy for gaining additional information, which can be used for various purposes. One preferred use of this redundancy is for error correction purposes.

The above-mentioned object of the present invention is further achieved by a method of the above-mentioned kind, characterized in that the analog electrical signals are transformed into the corresponding electrical logical binary signals before the electrical signals are processed. Hence, first the analog electrical signals are transformed into the corresponding electrical binary signals and then the electrical binary signals are processed.

Preferred embodiments and further advantages of the present invention are shown in the figures and described in detail hereinafter.

Figure 8:
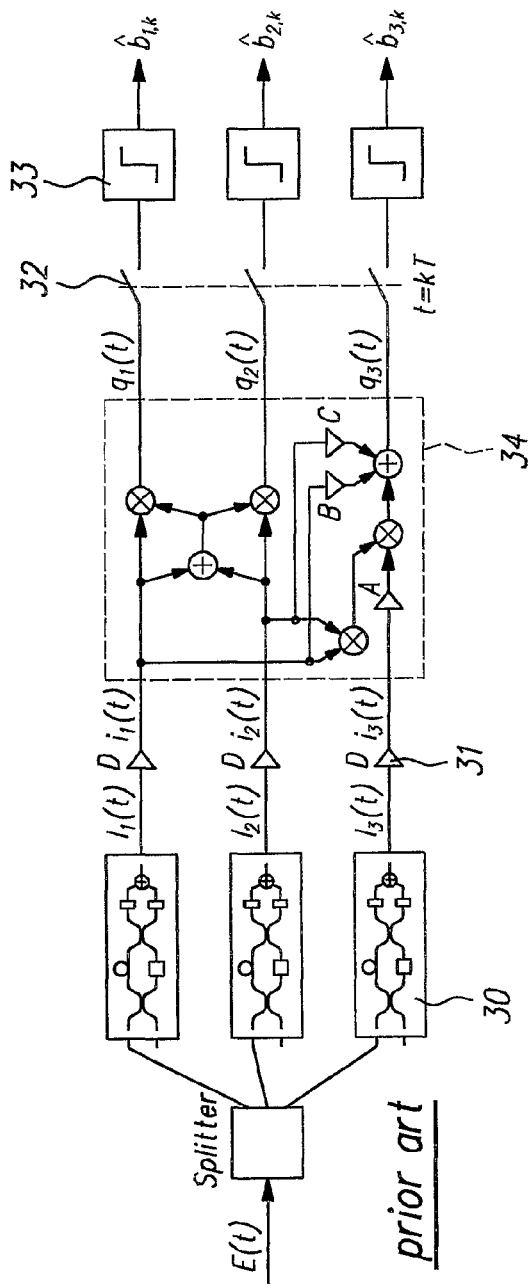
FIG. 8 shows a 8-DPSK receiver known from the prior art.

Known methods for binary optical modulation like the intensity modulation (IM) or the differential phase-shift keying (DPSK), allow transmission of 1 bit per symbol, leading to rather poor spectral efficiencies. Further, quaternary optical modulation methods like the differential quadrature phase-shift keying (DQPSK), or the combined amplitude-phase-shift keying (ASK-DPSK), transmit 2 bits per symbol. A further increase in bit rates and spectral efficiency can be obtained by a modulation method which makes use of an optical 8- or multiple-level differential phase-shift keying, 8-DPSK- or multi-DPSK. With the optical 8-DPSK 3 bits per symbol of information can be transmitted. The 8-DPSK is described in detail in Ohm, M. et al.: "Differential optical 8-PSK with direct detection (8-DPSK/DD)", 4. ITG-Fachtagung "Photonische Netze", Leipzig, May 2003, pages 177 to 181 and is shown in FIG. 8 of the present patent application.

Figure 6:
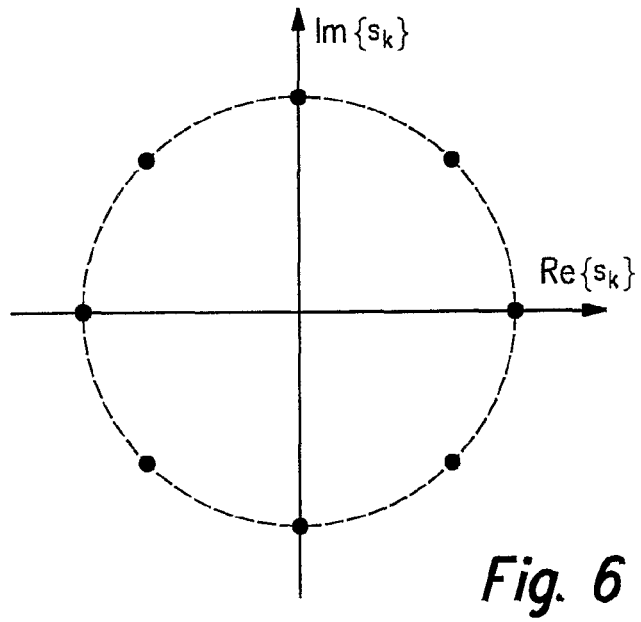
FIG. 6 shows a constellation diagram of a 8-DPSK modulation.

FIG. 6 shows a constellation diagram of 8-DPSK modulation with its eight signal points in the complex plane. All signal points $s_k$ have the same magnitudes and the phase angles are $\phi_k \in \{n\pi/4, n=0, 1 \ldots, 7\}$. Because a 8-DPSK receiver only evaluates the phase difference between subsequent symbols $s_k$, the absolute position of the signal points on the circle around its origin is not important, only the phase difference between adjacent symbols must amount to $\pm \pi/4$. Hence, 3 bits of information are assigned to each of the signal points $s_k$.

Figure 7:
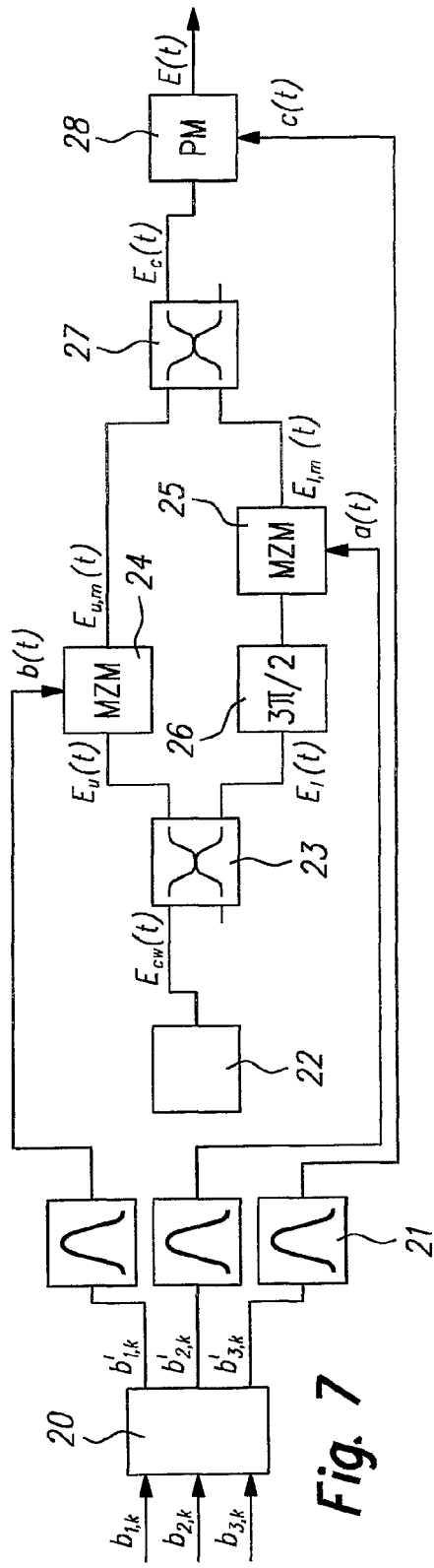
FIG. 7 shows a multi-level DPSK transmitter structure.

FIG. 7 shows a 8-DPSK transmitter. Three bit streams $b_{1,k}$, $b_{2,k}$ and $b_{3,k}$ are encoded in a differential encoder 20. The encoded bit streams $b'_{1,k}$, $b'_{2,k}$ and $b'_{3,k}$ are passed over an impulse shaper 21. Electrical drive signals a(t), b(t) and c(t) are generated by the impulse shapers 21 with raised cosine-impulse responses. Of course, the raised cosine-impulse response is only one of a variety of possible impulse-shapes, which means that the drive signals a(t), b(t) and c(t) can be generated with any other form of signal, too. Light from a continuous-wave (CW) laser 22 $E_{CW}(t)=\sqrt{P}\exp(j\omega_0 t)$ is split by a cross coupler 23 into an upper path $E_u(t)=\sqrt{P/2}\exp(j\omega_0 t)$ and a lower path $E_l(t)=j\sqrt{P/2}\exp(j\omega_0 t)$. P is the power of the CW laser 22 and $\omega_0/(2\pi)$ is the carrier frequency. $E_u(t)$ in the upper path is modulated in a Mach-Zehnder modulator (MZM) 24 by the binary electrical signal b(t). In the lower path the binary electrical signal a(t) modulates $E_l(t)$ in another MZM 25 after phase shifting (26) signal $E_l(t)$ in the lower path by $3\pi/2$. $E_{u,m}(t)$ and $E_{l,m}(t)$ are the modulated optical signals in the upper and lower paths.

The MZM 24, 25 are biased in such a way that with the unipolar electrical drive signals b(t) and a(t) (0 for bit '0', $V_\pi$ for bit '1') b(t) and a(t) become −1 for bit '0' and +1 for bit '1'. $V_\pi$ is the voltage that causes a phase difference of $\pi$ in the arms of the Mach-Zehnder modulator 24, 25. After combination in the following cross-coupler 27 an optical 4-PSK-signal $E_C(t)$ is achieved. In the following phase modulator 28 the binary electrical signal c(t) induces an additional phase shift of $\pi/4$ for bit '1' or leaves the optical signal unaltered for bit '0'. The optical signal at the output is E(t). The electrical field strength at the output of the transmitter is proportional to $\exp\{j[\omega_0 t+\phi(t)]\}$, where $\omega_0$ is the angular frequency of the laser 22 and $\phi(t)=\phi_1(t)+\phi_2(t)$ is the resulting phase angle. At the time instants t=k·T it becomes, $\phi(kT) \in \{n\pi/4, n=0, 1, \ldots, 7\}$, where T refers to the duration of the transmitted symbols. Of course, other 8-DPSK transmitter structures are possible, e.g. comprising three optical modulators in a row.

With the knowledge of a given receiver structure and its output signals, it is possible to derive three differential encoding functions for the differential encoder 20, so that the output bit sequences at the receiver are equal to the input bit stream $b_{1,k}$, $b_{2,k}$ and $b_{3,k}$ to the differential encoder 20 in the case of error-free transmission. The output bit sequences of the differential encoder 20 are $b'_{1,k}$, $b'_{2,k}$ and $b'_{3,k}$, which correspond to the modulator drive signals c(t), b(t), and a(t), respectively. The functions of the differential encoder 20, as an example, can be derived as:

$$b'_{1,k} = \overline{b'_{3,k-1}} \cdot b'_{1,k-1} \cdot b_{2,k} \cdot b_{3,k} + \overline{b'_{3,k-1}} \cdot \overline{b'_{1,k-1}} \cdot b_{2,k} \cdot \overline{b_{3,k}} +$$
$$\overline{b'_{3,k-1}} \cdot b'_{2,k-1} \cdot \overline{b_{2,k}} \cdot \overline{b_{3,k}} + \overline{b'_{3,k-1}} \cdot \overline{b'_{2,k-1}} \cdot \overline{b_{2,k}} \cdot b_{3,k} +$$
$$b'_{1,k-1} \cdot b_{1,k} \cdot b_{2,k} \cdot b_{3,k} + \overline{b'_{1,k-1}} \cdot b_{1,k} \cdot b_{2,k} \cdot \overline{b_{3,k}} +$$
$$b'_{1,k-1} \cdot \overline{b'_{2,k-1}} \cdot \overline{b_{1,k}} \cdot b_{3,k} + \overline{b'_{1,k-1}} \cdot b'_{2,k-1} \cdot \overline{b_{1,k}} \cdot \overline{b_{3,k}} +$$
$$\overline{b'_{1,k-1}} \cdot \overline{b'_{2,k-1}} \cdot \overline{b_{2,k}} \cdot b_{3,k} + b'_{1,k-1} \cdot b'_{2,k-1} \cdot \overline{b_{2,k}} \cdot \overline{b_{3,k}} +$$
$$b'_{3,k-1} \cdot b'_{2,k-1} \cdot \overline{b_{1,k}} \cdot \overline{b_{3,k}} + b'_{3,k-1} \cdot \overline{b'_{2,k-1}} \cdot \overline{b_{1,k}} \cdot b_{3,k} +$$
$$b'_{3,k-1} \cdot b'_{1,k-1} \cdot b_{1,k} \cdot \overline{b_{2,k}} \cdot \overline{b_{3,k}} + b'_{3,k-1} \cdot \overline{b'_{1,k-1}} \cdot b_{1,k} \cdot \overline{b_{2,k}} \cdot b_{3,k}$$

$$b'_{2,k} = \overline{b'_{3,k-1}} \cdot b'_{1,k-1} \cdot b'_{2,k-1} \cdot b_{3,k} + b'_{3,k-1} \cdot b'_{1,k-1} \cdot \overline{b_{1,k}} \cdot b_{3,k} +$$
$$b'_{3,k-1} \cdot \overline{b'_{1,k-1}} \cdot \overline{b_{1,k}} \cdot \overline{b_{3,k}} + b'_{2,k-1} \cdot b_{1,k} \cdot b_{2,k} \cdot b_{3,k} +$$
$$b'_{2,k-1} \cdot b_{1,k} \cdot b_{2,k} \cdot \overline{b_{3,k}} + \overline{b'_{3,k-1}} \cdot \overline{b'_{1,k-1}} \cdot \overline{b_{2,k}} \cdot \overline{b_{3,k}} +$$
$$\overline{b'_{3,k-1}} \cdot b'_{2,k-1} \cdot b_{2,k} \cdot \overline{b_{3,k}} + b'_{3,k-1} \cdot b'_{2,k-1} \cdot b_{2,k} \cdot b_{3,k} +$$
$$\overline{b'_{1,k-1}} \cdot b'_{2,k-1} \cdot \overline{b_{2,k}} \cdot \overline{b_{3,k}} + b'_{1,k-1} \cdot \overline{b'_{2,k-1}} \cdot \overline{b_{2,k}} \cdot b_{3,k} +$$

-continued $$\overline{b'_{1,k-1} \cdot b'_{2,k-1} \cdot \overline{b_{1,k}} \cdot \overline{b_{3,k}}} + b'_{1,k-1} \cdot \overline{b_{1,k}} \cdot \overline{b_{2,k}} \cdot b_{3,k} +$$

$$b'_{3,k-1} \cdot \overline{b'_{2,k-1}} \cdot b_{1,k} \cdot \overline{b_{2,k}} \cdot b_{3,k} + b'_{3,k-1} \cdot b'_{2,k-1} \cdot b_{1,k} \cdot \overline{b_{2,k}} \cdot \overline{b_{3,k}}$$

$$b'_{3,k} = \overline{b'_{3,k-1}} \cdot b_{1,k} \cdot \overline{b_{2,k}} + \overline{b'_{3,k-1}} \cdot \overline{b_{1,k}} \cdot b_{2,k} +$$

$$b'_{3,k-1} \cdot b_{1,k} \cdot b_{2,k} + b'_{3,k-1} \cdot \overline{b_{1,k} \cdot b_{2,k}}$$

The operators "+" and "·" in this context are logical OR- and AND-operations. The symbol "ˉ" refers to a logical NOT-operation. The functions can be realized as a combinational network, a look-up-table or as any other suitable method.

FIG. 8 shows an embodiment of a 8-DPSK receiver known from Ohm, M. et al.: "Differential optical 8-PSK with direct detection (8 DPSK/DD)", 4. ITG-Fachtagung, "Photonische Netze", Leipzig, May 2003, pages 177 to 181. The known 8-DPSK receiver comprises three separate decoding paths, one for each bit transmitted by means of a symbol and to be decoded in the receiver. Each of the paths comprises a delay and add filter (DAF) with a balanced detector 30 for transforming the optical 8-DPSK signal E(t) into a corresponding analog electrical signal $I_1(t)$, $I_2(t)$ and $I_3(t)$, respectively, an electrical amplifier 31 for normalization purpose, a sampling device 32 and a binary threshold decision device 33 for transforming the analog electrical signal $q_1(t)$, $q_2(t)$ and $q_3(t)$, respectively, into the corresponding (estimated) bit sequences $\hat{b}_{1,k}$, $\hat{b}_{2,k}$ or $\hat{b}_{3,k}$. Furthermore, the known receiver structure comprises processing means 34 for processing the electrical normalized analog signals $i_1(t)$, $i_2(t)$ and $i_3(t)$ corresponding to the optical 8-DPSK signal E(t). Due to the fact that the processing of analog electrical signals is based on determinated signal values, it is absolutely necessary in the 8-DPSK receiver known from the prior art to conduct the normalization (31) of the analog electrical signals $I_1(t)$, $I_2(t)$ and $I_3(t)$ before processing them in the processing means 34. Further, taking into consideration the high data rates commonly performed in the optical communication, the realization of the analog processing means 34 involves an immense effort.

According to the present invention, a multi-level DPSK receiver is suggested, which has a much simpler configuration and which allows a much easier decoding of multi-level DPSK signals. A first embodiment of a multi-level DPSK receiver according to the present invention is designated with reference sign 1 in FIG. 1. The receiver 1 can internally process not only binary electrical signals (comprising only 2 levels), but also multi-level electrical signals. The receiver 1 comprises only two paths, an upper path and a lower path. The optical multi-level DPSK signal E(t) is received by the receiver 1. The received multi-level DPSK signal E(t) is split up by a splitter 2 into two optical multi-level DPSK signals $E_0(t)$, one for each of the paths. The splitter 2 can be embodied as a cross coupler or as any other suitable element for splitting up optical signals. Each path comprises means 3 for transforming the optical multi-level DPSK signals $E_0(t)$ into corresponding analog electrical signals i(t). The opto-electrical transforming means 3 comprise an optical delay and add filter (DAF) 4 and an opto-electrical converter (O/E) in the form of a balanced detector 5. The DAF 4 is often referred to as Mach-Zehnder interferometer or Mach-Zehnder filter.

The electrical analog output signals $i_1(t)$ and $i_2(t)$ are then transformed into corresponding electrical logical binary signals $e_{11}$, $e_{12}$, $e_{21}$ and $e_{22}$ by appropriate analog-to-logical-binary transformation means 6. In the embodiment of the present invention shown in FIG. 1, the analog-to-logical-binary transformation means 6 each comprise two sampling and binary threshold decision devices 7 with threshold levels $E_{11}$, $E_{12}$, $E_{21}$, and $E_{22}$.

Figure 1:
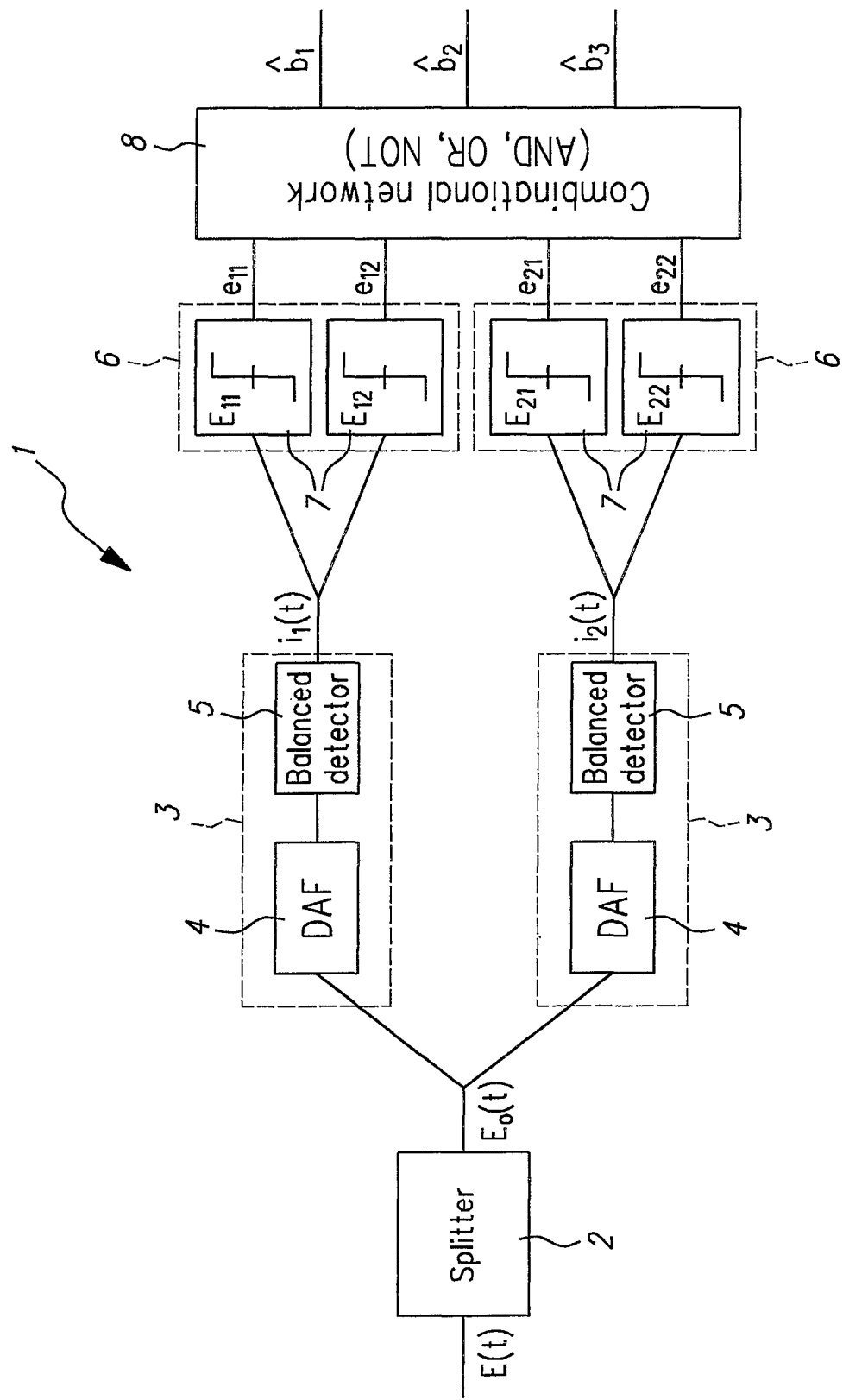
FIG. 1 shows a multi-level DPSK receiver according to the present invention in a first preferred embodiment.

The device 1 shown in FIG. 1 is a 8-DPSK receiver for decoding 8-DPSK signals E(t). Further, the receiver 1 of FIG. 1 is adapted for internally processing analog electrical signals corresponding to the optical 8-DPSK signal, with 5 electrical and 3 logical levels. FIG. 3b shows an appropriate eye diagram of such internal analog electrical signals $i_1(t)$, $i_2(t)$ comprising 5 electrical and 3 logical levels. Further, FIG. 3b shows the threshold levels $E_{11}=E_{21}$ and $E_{12}=E_{22}$ of the sampling and binary threshold decision devices 7. It can be seen that the first and third sampling and binary threshold decision devices 7 have a first threshold level $E_{11}$, $E_{21}$ (>0) and that the second and the fourth sampling and binary threshold decision devices 7 have a second threshold level $E_{12}$, $E_{22}$ (<0).

Returning to FIG. 1, the resulting electrical logical binary signals $e_{11}$, $e_{12}$, $e_{21}$, $e_{22}$ are forwarded to processing means 8 for processing them and for extracting and estimating the transmitted bit streams $\hat{b}_1$, $\hat{b}_2$ and $\hat{b}_3$ from the electrical logical binary signals $e_{11}$, ... $e_{22}$. The processing means 8 are realized as a combinational network for performing logical Boolean operations (AND, OR, NOT). Alternatively, the processing means 8 could comprise a look-up-table for extracting the transmitted bits $\hat{b}_1$, $\hat{b}_2$ and $\hat{b}_3$ from the binary signals $e_{11}$, ... $e_{22}$. Due to the fact that the processing means 8 process only logical binary signals, its structure can be considerably simplified. With an appropriate differential encoding on the transmitter-side the processing means 8 can be reduced to very few elements.

Figure 5:
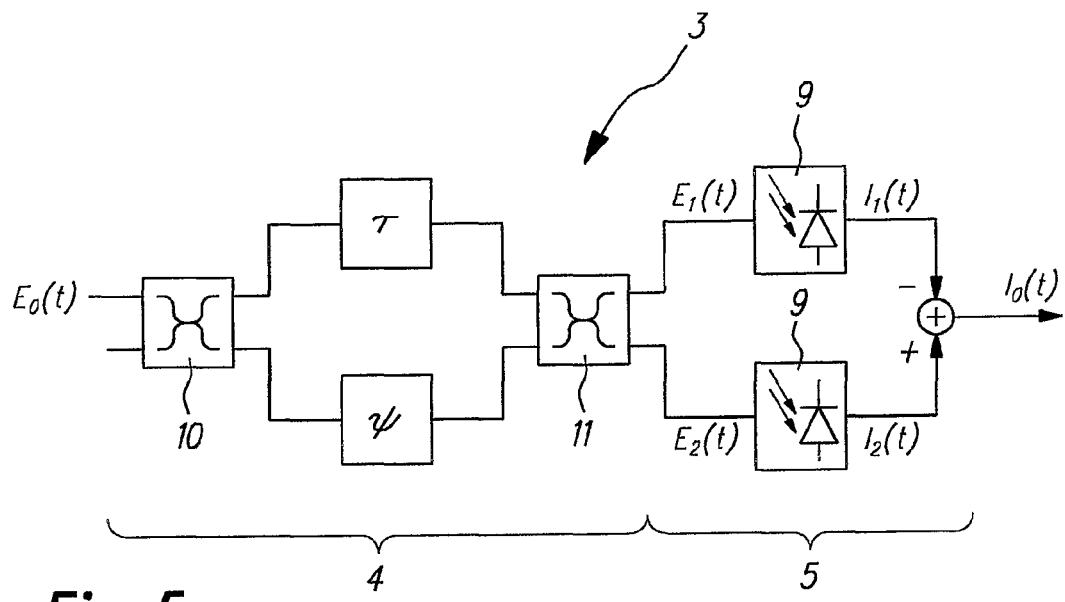
FIG. 5 shows means for transforming optical multi-level DPSK signals into corresponding analog electrical signals used in the multi-level DPSK receiver according to the present invention in a preferred embodiment.

An example for the opto-electrical transforming means 3 used in the receiver 1 is shown in FIG. 5. Each of the means 3 comprises the optical delay and add filter (DAF) 4 and the balanced detector 5 comprising two photo-diodes 9. The input signal $E_0(t)$ is split up by a cross coupler 10 into two optical signals. The input signal $E_0(t)$ essentially corresponds to the optical 8-DPSK signal E(t) to be decoded by the receiver 1, with the only difference that the input signal $E_0(t)$ has less power than the optical 8-DPSK signal E(t) Accordingly, the input signal $E_0(t)$ is split up into two optical signals, which essentially are identical to the input signal $E_0(t)$ with the only difference that they have less power than the input signal $E_0(t)$. The upper signal received from the cross coupler 10 is delayed by a time τ. The lower signal received from the cross coupler 10 is phase shifted by an angle ψ. Then, the two signals are brought together again in another cross coupler 11. The two optical output signals $E_1(t)$ and $E_2(t)$ of the DAF 4 are each detected by one of the photo diodes 9. The difference $I_0(t)$ of the electrical signals $I_2(t)$ and $I_1(t)$ is the output signal of the balanced detector 5.

Due to the large number of optical and electrical components, the DAF 4 is a complex and expensive part. Compared to the known 8-DPSK receiver, the multi-level DPSK receiver 1 according to the present invention can perform a decoding of any kind of multi-level DPSK signals with only two DAFs 4.

Figure 2:
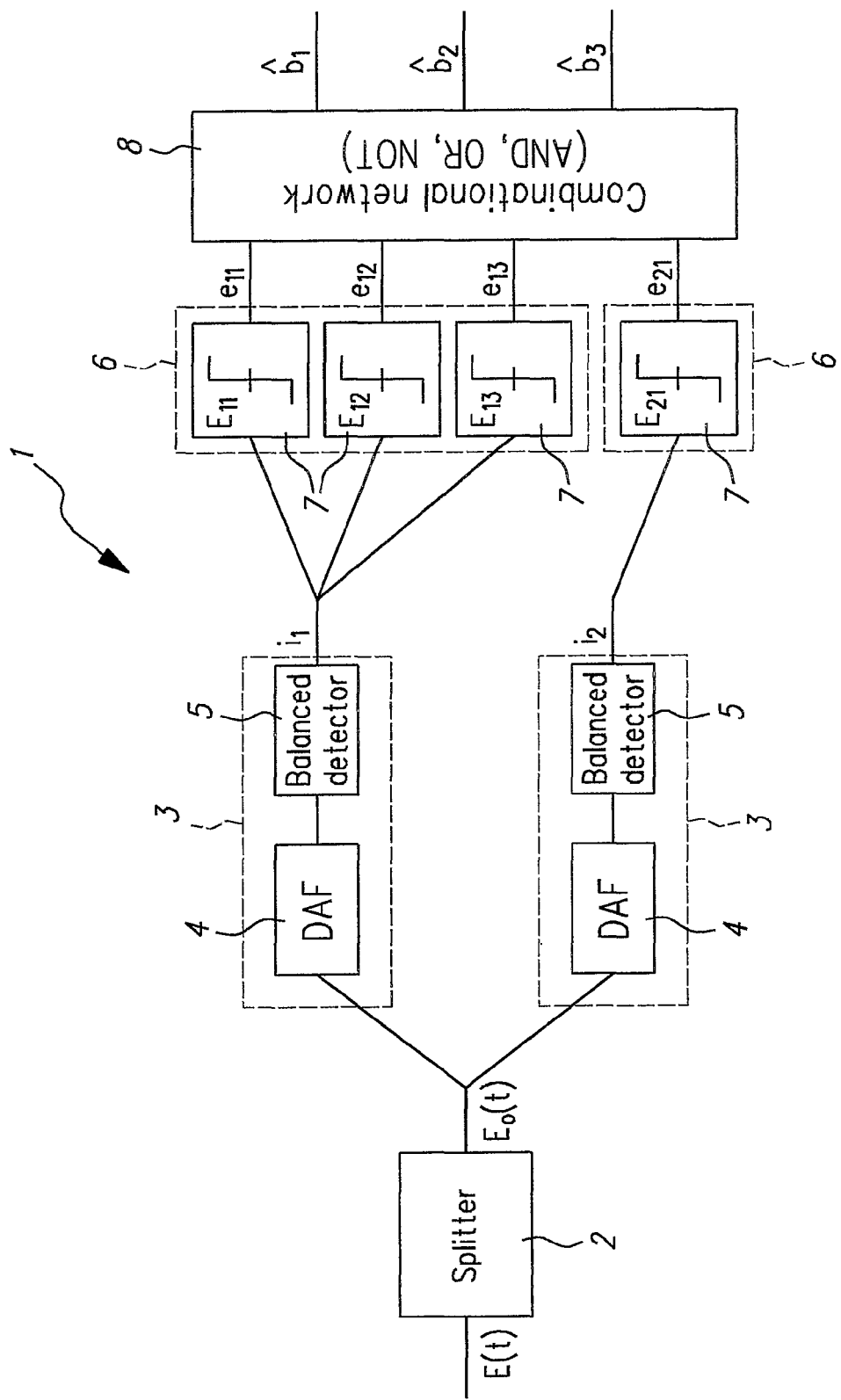
FIG. 2 shows a multi-level DPSK receiver according to the present invention in a second preferred embodiment.

FIG. 2 shows a second preferred embodiment of the device 1 for decoding a multi-level DPSK signal E(t) according to the present invention. The device 1 shown in FIG. 2 is a 8-DPSK receiver, too. It differs from the receiver 1 shown in FIG. 1 in the structure of the analog-to-logical-binary transformation means 6. According to the second embodiment of FIG. 2, the analog-to-logical-binary transformation means 6 of the upper path comprise three sampling and binary threshold decision devices 7, whereas the analog-to-logical-binary transformation means 6 of the lower path comprise only one sampling and binary threshold decision device 7. $\psi_1$ defines the phase angle set in the first DAF 4 in the upper path, and $\psi_2$ defines the phase angle set in the second DAF 4 in the lower path. In the receiver 1 shown in FIG. 2, the phase angles $\psi_1$, $\psi_2$ are set to different values than in the receiver 1 shown in FIG. 1. Basically, the requirement $|\psi_1-\psi_2|=\pi/2$ must be fulfilled. The receivers 1 shown in FIGS. 1 and 2 comprise two different realizations of the phase angles $\psi_1$, $\psi_2$, which of course both make sense.

Figure 3A:
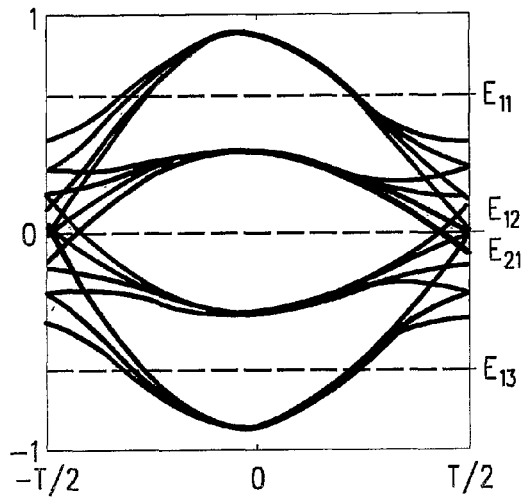
FIG. 3 shows various eye diagrams of different internal analog electrical signals corresponding to the optical multi-level DPSK signal decoded by the multi-level DPSK receiver according to the present invention.
Figure 3B:
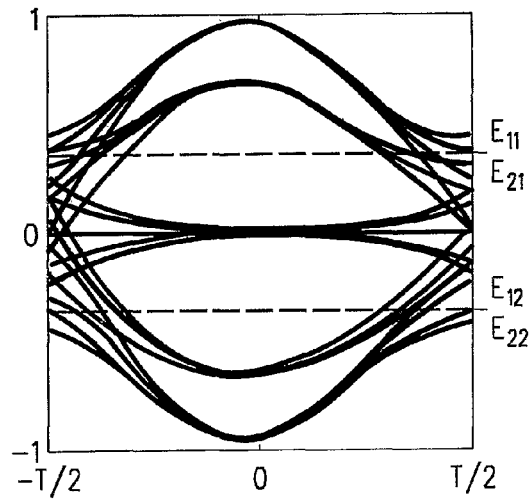

A 8-DPSK receiver 1 shown in FIG. 2 serves for decoding 8-DPSK signals E(t) allowing internal processing of analog electrical signals with 4 logical levels (cf. FIG. 3a). The second and the fourth sampling and binary threshold decision device 7 have a first threshold level $E_{12}$, $E_{21}$. The first sampling and binary threshold decision device 7 has a second threshold level $E_{11}$. The third sampling and binary threshold decision device 7 has a third threshold level $E_{13}$. Hence, in the embodiment shown in FIG. 2, the 8-DPSK receiver 1 or the analog-to-logical-binary transformation means 6 comprise binary threshold decision devices 7 with three different threshold levels.

The processing means 8 are adapted to recover the transmitted bit sequences from the digital electrical signals $e_{11}, \ldots e_{22}$. By means of a combinational network, a look-up-table or any other appropriate method the transmitted bit sequences are estimated from the four decision outputs $e_{11}, \ldots e_{22}$. The logical or operational function of a certain combinational network 8 on the receiver side are, for example:

$$\hat{b}_1 = \overline{e_{12} \cdot e_{21}} + e_{11} \cdot e_{22}$$

$$\hat{b}_2 = e_{12} \cdot e_{21} + \overline{e_{11} \cdot e_{22}}$$

$$\hat{b}_3 = e_{21} + \overline{e_{11}} \cdot e_{22}$$

The estimated bit-sequences at the receiver 1 are often identified by the '^' on top of the appropriate variable. The increase in the look-up-table can be created according to these switching or operating functions. If desired, the functions can be transformed in an equivalent way. Of course, any other kind of suitable logical function can be realized in the combinational network 8, too. Using a different transmitter structure and/or a different differential encoder 20, the operating or switching functions to be embodied in the combinational network 8 may change, too.

Figure 3C:
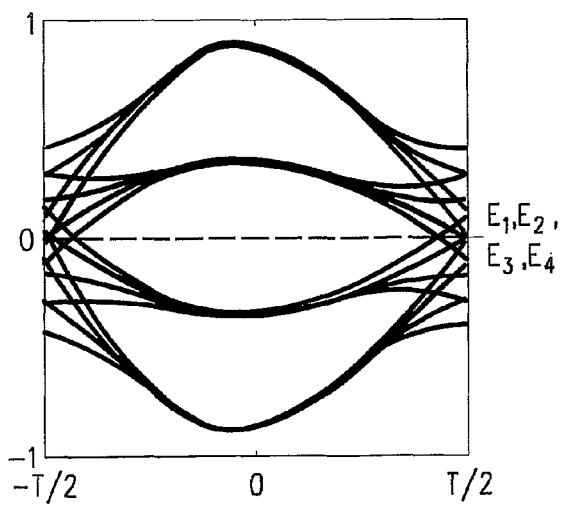

The decision or threshold levels $E_{11}, \ldots, E_{22}$ can be positioned in the middle of the upper and lower eyes and/or the center eye of the eye diagrams shown in FIG. 3. However, taking into consideration, e.g., transmission parameters, the decision or threshold levels $E_{11}, \ldots, E_{22}$ can be optimized and can be positioned slightly higher or lower, if desired and/or necessary.

The multi-level DPSK receiver 1 according to the present invention is independent from the electrical and/or optical impulse shaping at the transmitter. In particular, the receiver 1 may be used with non-return-to-zero-(NRZ) and return-to-zero-(RZ) impulse shaping.

In the multi-level DPSK receiver 1 according to the present invention the delay $\tau$ for the upper and the lower DAF 4 is equal to the symbol length T. The phase shift $\psi$ in the upper DAF 4 is $\psi_1=\Pi/4$. The phase shift $\psi$ in the lower DAF 4 is $\psi_2=7\cdot\Pi/4$. The phase shifts $\psi$ can be performed modulo $2\cdot\Pi$, too. In principle, it is sufficient to comply with the requirement $|\psi_1-\psi_2|=\pi/2$. Appropriate measures should be taken that the delay $\tau$ and phase shifts $\psi$ remain constant in time under the influence of disturbance and interference. For receivers 1 with internal 4-level electrical signals $\psi_1=\Pi/8$ and $\psi_2=3\cdot\Pi/8$. The selection of $\psi_1=(2\cdot k+1)\cdot\Pi/4$, with $k\in Z$ should apply for all electrical 5-level signals and the selection of $\psi_1=(2\cdot k+1)\cdot\Pi/8$, with $k\in Z$ should apply for all electrical 4-level signals, where $\psi_2$ is always determined in order to satisfy the requirement $|\psi_1-\psi_2|=\pi/2$ Looking at the example of a RZ-impulse shaping, the improved characteristics of the present invention can be clearly shown. In this case the transmission distance comprises a dispersion-compensating fiber (DCF) for pre-compensating dispersion, a standard single-mode fiber (SSMF) with a length of 80 km and a second DCF for post-compensation of the dispersion. The DCF lengths have been selected such that a certain residual dispersion $r_d$ and a certain pre-compensation rate p is achieved.

Figure 4:
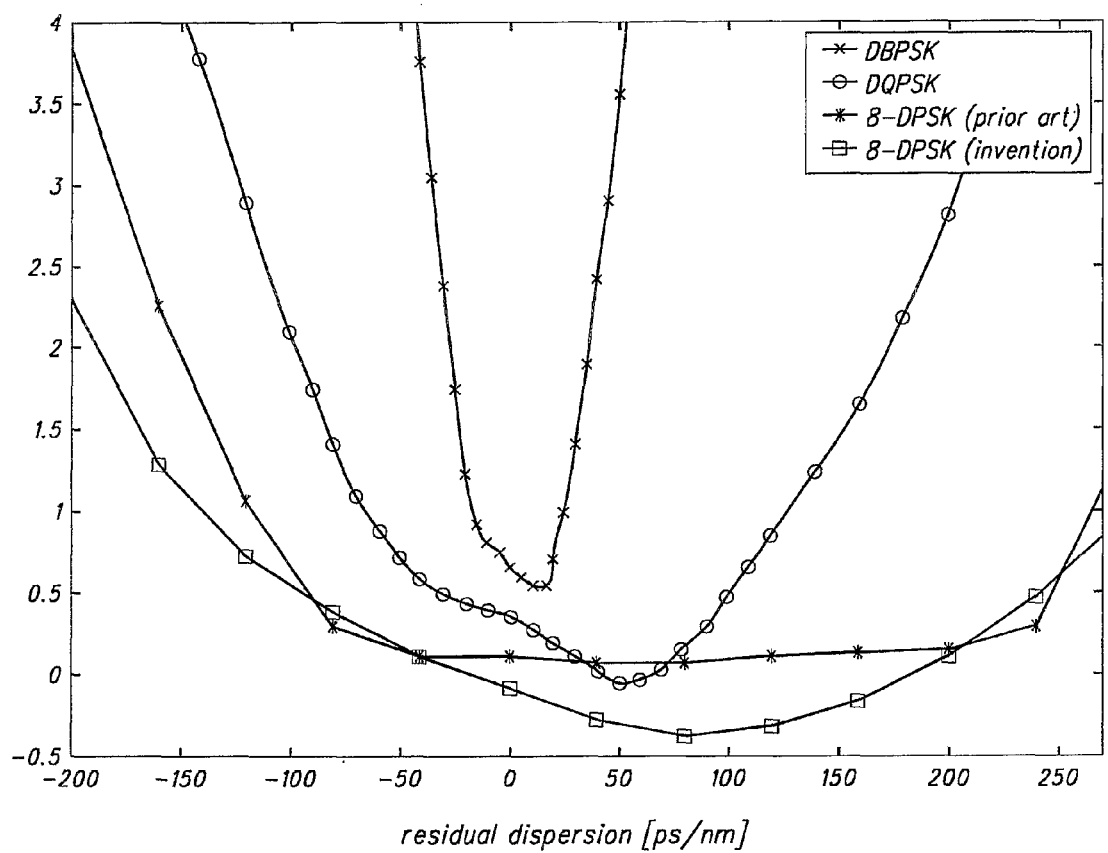
FIG. 4 shows an eye-opening penalty (EOP) for DBPSK, DQPSK and 8-DPSK over the residual dispersion for 15 dBm SSMF input power.

FIG. 4 shows an eye-opening penalty (EOP) for the residual dispersion $r_d$ for 15 dBm SSMF input power for the case that for each value of $r_d$ the value of the pre-compensation p is selected such that a minimal EOP is achieved. For the RZ-8-DPSK squares mark the graph of the receiver 1 according to the invention. RZ-8-DPSK has lower EOP-values as RZ-DBPSK and as RZ-DQPSK. If the results of the known embodiments are compared with the multi-level DPSK receiver 1 according to the present invention, it is apparent that the receiver 1 achieves lower EOP-values than the known receivers. With an input power typical for real systems of 15 dBm, the difference to the prior art amounts to almost 0.5 dB. With a number of SSMF sections, the difference will become even larger and the advantages of the multi-level DPSK receiver 1 according to the present invention will become more grave.

Besides the considerably reduced complexity of the circuit of the receiver 1 according to the present invention, the multi-level DPSK receiver 1 also has an improved tolerance towards fiber nonlinearities and dispersion.

The invention claimed is:

1. Device for decoding an optical multi-level DPSK signal, the device comprising:
   means for receiving the multi-level DPSK signal;
   at least two means for transforming optical multi-level DPSK signals into corresponding analog electrical signals;
   means for splitting up the received multilevel DPSK signal into at least two optical multilevel DPSK signals, one for each of the opto-electrical transforming means;
   means for processing electrical signals; and
   at least two means for transforming the analog electrical signals into corresponding electrical logical binary signals, each of the at least two means for transforming the optical signals include an optical delay and an add filter comprising an upper and lower path;
   characterized in that the analog-to-logical-binary transformation means comprises four sampling and binary threshold decision devices, disposed before the processing means and that the processing means process electrical logical binary signals and an upper signal passing on the upper path of each of the at least two means is delayed by an identical time T and the lower signal passing along the lower path is phase shifted by an angle $\Psi$.

2. Device according to claim 1, characterized in that the device comprises exactly two opto-electrical transforming means.

3. Device according to claim 2, characterized in that each of the opto-electrical transforming means comprises the optical delay and add filter (DAF) and an opto-electrical converter (O/E).

4. Device according to claim 1, characterized in that the processing means comprise means for conducting logical Boolean operations on the electrical logical binary signals received from the analog-to-logical-binary transformation means.

5. Device according to claim 1, characterized in that the device serves for decoding an optical 8-DPSK signal.

6. Device according to claim 1, characterized in that at least one of the four sampling and binary threshold decision devices has a different threshold level than the other sampling and binary threshold decision devices.

7. Device according to claim 1, characterized in that a first and a second of the sampling and binary threshold decision devices is assigned to a first analog-to-logical-binary transformation means and that a third and a fourth of the sampling and binary threshold decision devices is assigned to a second analog-to-logical-binary transformation means.

8. Device according to claim 7, characterized in that the first and the third sampling and binary threshold decision devices have a first threshold level and that the second and the fourth sampling and binary threshold decision devices have a second threshold level.

9. Device according to claim 1, characterized in that a first of the sampling and binary threshold decision devices is assigned to a first analog-to-logical-binary transformation means and that a second, a third and a fourth of the sampling and binary threshold decision devices is assigned to a second analog-to-logical-binary transformation means.

10. Device according to claim 9, characterized in that the first and the fourth sampling and binary threshold decision devices have a first threshold level, that the second sampling and binary threshold decision device has a second threshold level and that the third sampling and binary threshold decision device has a third threshold level.

11. Device according to claim 1, characterized in that the processing means estimate the transmitted bit sequences $\{b_{1,k}, b_{2,k}, b_{3,k}\}$ from the electrical logical binary signals, and that further processing of the electrical logical binary signals is performed in order to gain additional information including at least an error correction.

12. Method for decoding an optical multi-level DPSK signal, the method comprising the steps of:
receiving the multi-level DPSK signal;
splitting up the received multi-level DPSK signal into at least two optical multi-level DPSK signals;
transforming the at least two split optical multi-level DPSK signals into corresponding analog electrical signals;
transforming the analog electrical signals into corresponding electrical logical binary signals utilizing at least two means, each of the at least two means include an optical delay and an add filter comprising an upper and lower path, the at least two means comprising four sampling and binary threshold decision devices; and
processing electrical signals, characterized in that the analog electrical signals are transformed into the corresponding electrical logical binary signals before the electrical signals are processed and an upper signal passing on the upper path of each of the at least two means is delayed by an identical time T and the lower signal passing along the lower path of each of the at least two means is phase shifted by an angle $\Psi$.

\* \* \* \* \*